United States Patent [19]

Nobile et al.

[11] 4,088,333

[45] May 9, 1978

[54] JAWS, GUIDING BASE PLATES AND ADJUSTING MECHANISM FOR CHUCKS

[76] Inventors: Alfred Francis Nobile, 3 Ledgewood Trail; Douglas Allan Nobile, 12 W. Cherry Tree La., both of Sparta, N.J. 07871

[21] Appl. No.: 682,515

[22] Filed: May 3, 1976

[51] Int. Cl.² .............................................. B23B 31/19
[52] U.S. Cl. ........................................ 279/60; 279/58; 408/240
[58] Field of Search ....................... 279/60, 58, 53, 49, 279/56, 64, 65, 28, 59; 408/240

[56] References Cited

U.S. PATENT DOCUMENTS

| 914,255 | 3/1909 | Farnham | 279/60 |
| 1,396,022 | 11/1921 | Carriere | 279/60 |
| 1,930,022 | 10/1933 | Tautz | 279/58 |
| 2,245,316 | 6/1941 | Amsler | 279/58 X |

FOREIGN PATENT DOCUMENTS

| 598,838 | 12/1925 | France | 279/60 |
| 115,978 | 5/1918 | United Kingdom | 279/60 |

Primary Examiner—Z. R. Bilinsky
Attorney, Agent, or Firm—Frederick W. Padden

[57] ABSTRACT

A drill chuck is disclosed with a pair of jaws and a pair of jaw guiding base plates for centering and holding a drill bit. The chuck comprises a cylindrical housing for the pair of base plates in which the jaws are functionally located. Internal channels and platforms of the above plates guidedly control the movement of the pair of jaws and support a manual adjusting mechanism. The configuration of each of the jaws is such that two rows of triangular spaced apart teeth furnish an adjustable drill receiving opening, or corridor, which is constantly a square for the full range of opening adjustments. Shoulder extensions of the jaws are guidedly located in "V" shaped channels of the base plates. Dowel pins couple an adjusting mechanism to the jaws for guided movement. The adjusting mechanism includes a wedge-shaped body coupled to the dowel pins and a shaft having a left-hand threaded portion threadedly secured to the wedge body and a right-hand threaded portion threadedly retaining a jam nut and an adjusting knob. The nut is frictionally secured within cavities of the base plates. Rotation of the adjusting knob causes the movement of the left and right-hand portions of the shaft through the wedge body and the jam nut for controlling the opening and closing of the jaw opening, or corridor, for centering and holding a drill.

12 Claims, 10 Drawing Figures

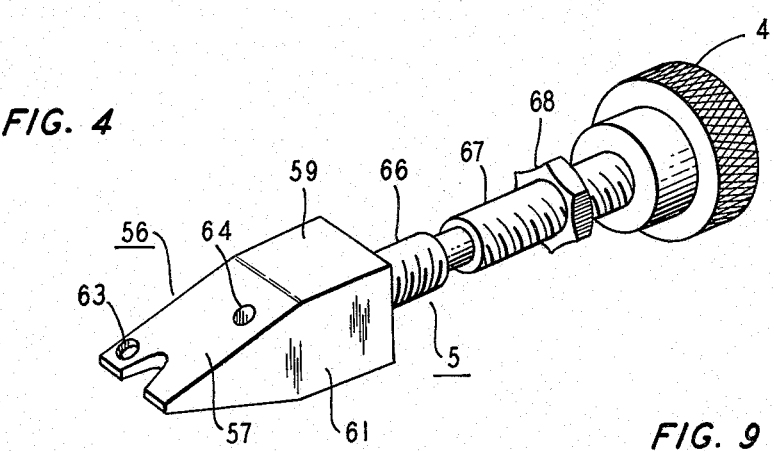
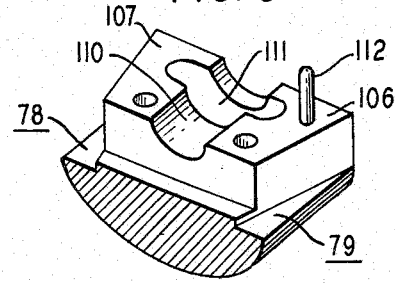
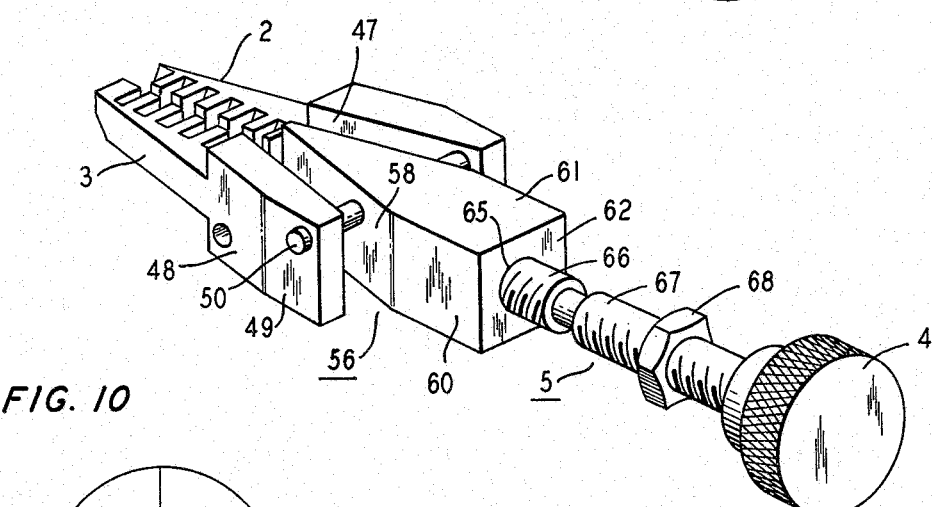
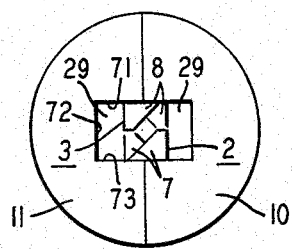

JAWS, GUIDING BASE PLATES AND ADJUSTING MECHANISM FOR CHUCKS

BACKGROUND OF THE INVENTION

This invention relates to a holder for drill instruments and particularly to a chuck assembly for facilely centering and holding drill bits illustratively for use in drill sharpening and milling machines.

The art of chuck design has progressed to the extent that a variety of chucks are presently available for use in virtually all machines involving drilling. A substantial percentage of such chucks function on the principle that a plurality of jaws are adjustably opened and closed to receive and embrace the shank of the drill for a desired sharpening, milling or general drilling operation. An example of such a chuck in widespread use is found in a conventional hand drill and it generally employs three jaws for holding a drill.

For precision work, time-consuming procedures as well as complicated and expensive chucks are required to provide for highly accurate centering and holding of a drill bit. The procedures typically involve measurements of, for example, angular alignment of a drill within the chuck. Inaccurate alignment of the shank or fluted segments of a drill within the embrace of the chuck jaws as a result of improper procedures or inherently nonprecise chucks usually results in problems such as incorrect angular sharpening of the drill, undesired errors in milling or drilling by milling or drilling machines, and even the fracture or breaking of the drill itself.

The latter problems assume major proportions in using small diameter, or micro, drills. The term microdrill is used to designate a small diameter drill, for example, ranging from approximately 0.060 of an inch down to 0.001 of an inch in diameter. These drills are, for example, designated by 0.001 diameter sizes.

A long recognized deficiency in the prior art has been that no facilities have heretofore been available for simply and economically enabling microdrills to be resharpened after its lip edge has been dulled, impaired or broken by usage. As a consequence, it has been a customary practice in the art to discard such drills despite the fact that they could be resharpened if facilities were available to do so. Obviously, such a practice is costly and wasteful.

A principal factor contributing to such inadequacies in the prior art has been the nonprecise centering and embracing of drills within the jaws of available chucks. A long-felt need therefore has existed for improvements in chucks especially those suitable for use with microdrills.

SUMMARY OF THE INVENTION

The foregoing deficiency and problems are overcome by a specific exemplary embodiment of our invention in which a chuck is provided with a single pair of jaws and a pair of jaw guiding base plates for accurately and facilely centering and holding a drill bit particularly of the microdrill sizes. Utilization of this chuck virtually eliminates the need for angular measurements for insuring proper centering of a drill within the grasp of the chuck. The accuracy of centering and holding of microdrills makes our illustrative chuck advantageously useful for the resharpening of impaired drill bits especially those of microsizes and thus reduces the necessity for the existent throwaway practice of the prior art.

The chuck comprises a cylindrical housing for the pair of base plates in which the pair of jaws are functionally located. These plates advantageously have an internal construction of channels and platform extensions which guidedly control the movement of the pair of jaws and support a manual jaw adjusting mechanism. Advantageously, the configuration of each of the jaws is such that it furnishes an adjustable drill receiving opening, or corridor, which is, by way of example, constantly a square for the full range of opening adjustments.

A feature of our invention is that each of the jaws provides two rows of triangular-shaped teeth and with a unitary guiding platform having shoulder extensions for guided movement within the aforementioned channels of the base plates. The teeth of said row occur alternately with respect to one another and with respect to meshing teeth in rows of the other jaw. Meshing closure and opening of the teeth of the pair of jaws is controlled by a pair of dowel pins each one of which is secured in a bore of an individual one of the guiding platforms and is slidably movable through another bore in the other one of the jaw guiding platforms. A subassembled pair of jaws with the dowel pin arrangement facilitates the centering of a drill by providing rows of triangular-shaped teeth which define a right angle of generally "V" shaped corridor on each jaw and a square-shaped opening by the pair of jaws for receiving a drill for holding.

The jaw adjusting mechanism illustratively includes a wedge-shaped body having a pair of bores in which the aforementioned dowel pins slidably move during adjustment of the jaw opening. Another bore which is threaded is located on a rear portion of the wedge body and threadedly interfits with a left-hand threaded portion of a shaft. The latter also includes a right-hand threaded portion onto which is threaded a hex jam nut and a hand adjustment knob.

The base plates each comprise a pair of channels configured in a "V" shape and formed by walls and a wedge-shaped platform. Part of the latter platform includes a raised platform which illustratively has a concave semicylindrical-shaped wall that defines half of a bore for rotatably housing the threaded shaft. An oval cavity is also provided in the raised platform for nonmovably and frictionally securing the hex jam nut of the adjusting mechanism. The walls forming the channels have slotted depressions for enabling longitudinal movement of the dowel pins during their adjustable movement through the bores in the jaw guiding platforms.

A subassembly of the jaws and the adjusting mechanism is housed within the base plates with the shoulder extensions of the jaw platforms slidably and guidedly inserted in the "V" shaped channels. At the same time, the hex jam nut rests in the oval cavity of the raised platform and the threaded shaft is rotatably secured within the cylindrical bore of the raised platforms of the base plates and within the threaded bore of the wedge-shaped body.

Adjustment of the jaw opening to a full closure and meshing of the jaw teeth occurs by manual clockwise rotation of the adjusting knob. As a result, the right-hand threaded portion of the shaft moves through the hex jam nut and the left-hand threaded portion of the shaft moves outwardly from the bore in the wedge-shaped body. These actions urged the wedge-shaped body and the dowel pins resultingly to move the jaws so that their teeth mesh closer together. The jaw movement causes the dowel pins slidably to move through bores in the wedge-shaped body and the jaw platforms for providing aligned movement of the jaws with respect to each other. Aligned movement and registration of the teeth is further guided by the movement of the jaw shoulders in the channels of the base plates. All through the adjustable meshing of the jaw teeth, a corridor which is adjustably square in a longitudinal direction is provided for receiving and accurately embraching a shank or fluted portion of an instrument such as a drill. Upon engaging the shank portion, the square opening essentially provides for the self-centering of the shank and drill for desired sharpening, drilling or milling operations.

Movement of the jaws from the closed to an opened position is effected by rotating the adjustment knob counterclockwise. As a result, the right-hand threaded portion on the shaft moves through the fixed jam nut and the left-hand threaded portion moves into the bore of the wedge-shaped body. Resultingly, the wedge-shaped body and dowel pins are urged so that the jaw teeth move away from their meshing position. Aligned movement and registration of the jaws is controlled by the shoulders of the jaw platforms as well as by the dowel pins within the bores or the wedge-shaped body and jaw platforms.

DRAWING DESCRIPTION

The foregoing features and advantages, as well as others, of this invention, may become more apparent from a reading of the following detailed description of a specific illustrative embodiment of the invention with reference to the drawing in which:

FIG. 4 depicts the adjusting mechanism;

FIG. 5 shows a subassembly of the chuck jaws and the adjusting mechanisms;

DETAILED DESCRIPTION

Figure 1:
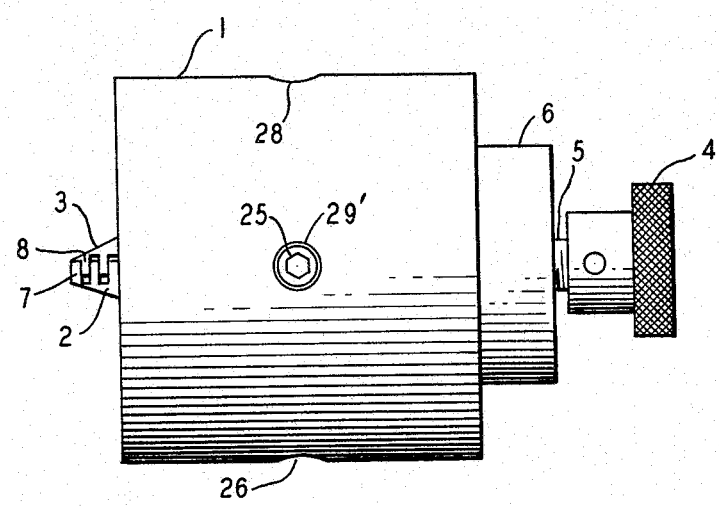
FIG. 1 is an overall side view of the chuck unit with its housing, jaws and adjusting knob.

In FIG. 1, a chuck unit is shown having a housing 1 with an exemplary round exterior surface, a pair of chuck jaws 2 and 3, and an adjusting knob 4 attached to a shaft 5 which is coupled through an inner housing subassembly 6 to a jaw adjusting mechanism. Jaws 2 and 3 are shown in a fully closed position in FIG. 1 with their respective spaced-apart teeth 7 and 8 meshing together as is more fully explained hereinafter with respect to FIGS. 3, 7, and 8.

Figure 2:
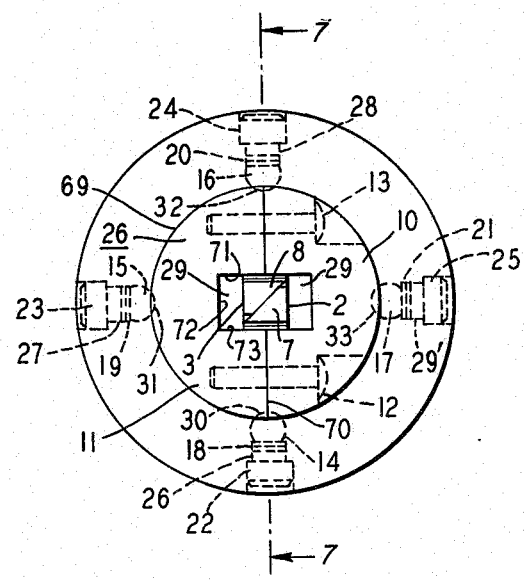
FIG. 2 is a front view into the closed jaws of the chuck unit.

FIG. 2 depicts a front view of the structure of FIG. 1 looking into the closed meshed teeth 7 and 8 of jaws 2 and 3. The jaws are functionally secured within a rectangular aperture 9 defined by channels in an inner housing subassembly 6. The latter comprises two separate base devices 10 and 11 which are essentially mirror symmetrical in structural configuration and which are secured together as a subassembly by means of a pair of screws 12 and 13 that threadly interfit with mating threaded portions of base 10. The assembled bases 10 and 11 are shown fastened within an inner bore of the chuck housing 1 by means of four fasteners. The latter include steel balls 14, 15, 16, 17, belleville springs 18, 19, 20, 21, and threaded Allen screws 22, 23, 24, 25 housed within threaded cavities 26, 27, 28, 29 of the outer housing 1 and ball receiving cavities 30, 31, 32, 33 of bases 10 and 11. Advantageously, it is within our teaching that housing 1 is securable to a fixture or stand of a grinding machine for suitable grinding of a drill (not shown) retained within the embrace of jaws 2 and 3.

Figure 3:
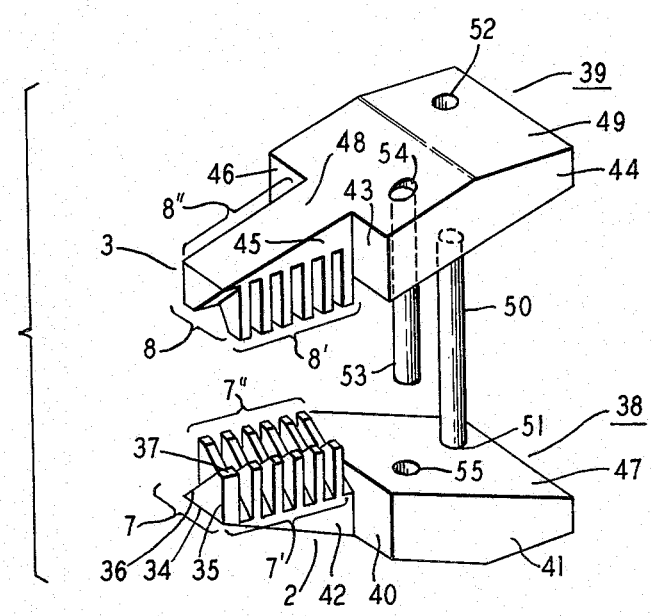
FIG. 3 is a perspective view of the chuck jaws segregated from the chuck unit.

A fundamental building block of the exemplary embodiment comprises a jaw subassembly as depicted in FIG. 3. It includes a pair of jaw units 2 and 3 each of which has a plurality of teeth 7 and 8. Illustratively, the teeth 7 of jaw 2 comprise two rows 7' and 7'' of spaced-apart teeth. The teeth 8 or jaw 3 similarly comprise two rows of spaced-apart teeth designated rows 8' and 8'', but only row 8'' is viewable in FIG. 3.

Each tooth of each of the rows 7', 7'', 8' and 8'' is configured in a generally triangular (isoceles) cross-sectional shape. For example, the frontmost tooth of row 7' is generally triangular with a base 34, height 35 and hypothenuse 36. The height of hypothenuse are joined together by a flat surface 37. The planar dimensions of base, height and hypothenuse portions of each such triangular cross-section are respectively equal for each tooth. Moreover, for each tooth in any same one of the rows 7', 7'', 8', and 8'', the respective base, height, and hypothenuse portions of the triangular cross-section lie in the same aligned planes. Peripheral surfaces forming the hypothenuse and height portions of each tooth are planar and are illustratively of the same dimensional thickness.

From the left-hand to the right-hand sides of FIG. 3, the teeth of rows 7' and 7'' are shown as occurring alternately with respect to one another and are aligned to form illustratively a generally "V" shaped notch suitable for receiving a drill instrument to be secured within the chuck. The teeth of rows 8' and 8'' also are shown as occurring alternately with respect to those of rows 7' and 7'' and to one another and are aligned to form illustratively a generally "V" shaped notch. Such a structural configuration advantageously enables a drill instrument facilely and accurately to be functionally centered within the holding grasp of the chuck jaws 2 and 3 for suitable drilling, sharpening or milling operations.

The unitary structure of the jaw subassembly 2 includes a platform member 38 which advantageously is utilized to control and guide the opening and closing of the teeth of the jaws. A similar platform member 39 forms part of the jaw subassembly 3. The width dimension of each such platform member as shown in FIG. 3 is greater than the uniform base side dimension of the teeth. These dimensional characteristics are provided so that shoulder extensions are formed for a controlled and guided movement of the jaw subassemblies within channels of the base subassemblies as explained later with respect to FIGS. 6, 7, and 8. Illustratively, one such should extension for jaw 2 is formed by side surfaces 40 and 41. Surface 40 is flat and is at a right angle to the jaw surface 42 from which the height portions of the row of teeth 7' are cut. Surface 41 is also flat and in a plane parallel to surface 42. Another shoulder for jaw 2 is formed on its opposite side with surfaces and configurations (not shown) similar to surfaces 40 and 41.

Jaw 3 has a shoulder extension formed by side surfaces 43 and 44. Surface 43 is flat and at a right angle to the jaw surface 45 from which the height portions of the row of teeth 8' are cut or milled. Surface 44 is also flat and in a plane parallel to surface 45. Another shoulder extension for jaw 3 is formed on its opposite end utilizing a side surface 46 and surfaces (not shown in FIG. 3) but corresponding to surfaces 44 and 45.

As shown in FIG. 3, jaw 2 has a flat rectangular inner surface 47, the plane of which lies in the same plane as that of the side surface on which the base sides of teeth 7 are cut. Jaw 3 has a generally mirrored surface and configuration of the corresponding inner surface 47 of jaw 2.

In FIG. 3, jaw 3 advantageously comprises a flat outer surface 48 which is formed in part of the platform 39 and in part in that portion of the subassembly from which the teeth are cut. Surface 48 is inclined upwardly from the frontmost tooth in row 8" toward another flat surface 49 which projects angularly downward in a plane from that surface 48. Jaw 2 has generally mirrored outer surfaces and configurations to those of surfaces 48 and 49 of jaw 3.

To aid in controlling the aligned guiding of the opening and closing of the teeth of jaws 2 and 3, platform 38 has a dowel pin 50 fixedly secured within a bore 51 for aligned and slidable movement through a slightly larger diameter bore 52 which extends between outer surface 49 and an opposite inner surface (not shown) of platform 39. Similarly, platform 39 has a dowel 54 for aligned and slidable movement through a slightly larger diameter bore 55 between inner surface 47 and an outer surface (not shown). A parallel plane alignment is utilized for the bores and dowel pins of platforms 38 and 39 such that, illustratively, the surface 47 and its corresponding inner surface (not shown) of platform 39 are moveable in parallel planes away from and closer to each other and for opening and closing the meshing of teeth 7 and 8 as hereinafter explained.

FIGS. 4 and 5 disclose part of the jaw adjusting mechanism. It includes a wedge-shaped body 56 which has tapered planar jaw facing surfaces 57 and 58, flat surfaces 59 and 60, flat side surfaces, such as surface 61, and a flat rear surface 62. A pair of bores 63 and 64 are incorporated in body 56 for slidably containing the dowel pins 50 and 53. Bores 63 and 64 are, of course, of slightly larger inner diameter than the inner diameter of pins 50 and 53.

As illustrated in FIG. 5, a threaded bore 65 is provided through a central portion of the rear surface 62. Bore 65 threadedly and matingly interfits with a threaded adjustment shaft, or rod 5, at its left-hand threaded portion 66. Rod 5 also has a right-hand threaded portion 67 which threadedly interfits with a hex nut jam nut 68 and a knob 4.

FIG. 5 also illustrates the assembly of the chuck jaws 2 and 3 with the respective teeth thereof meshing and in aligned registration with the dowel pins 50 and 53 as they are located within bores 52 and 54 of platform 39 and bore 51 of platform 38 as well as bore 64 of the wedged-shaped body 56.

Figure 6:
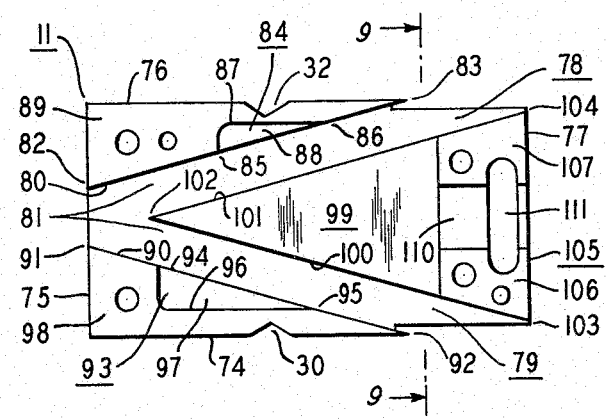
FIG. 6 illustrates the base device segregated from the chuck housing, jaws and adjusting mechanism.
Figure 7:
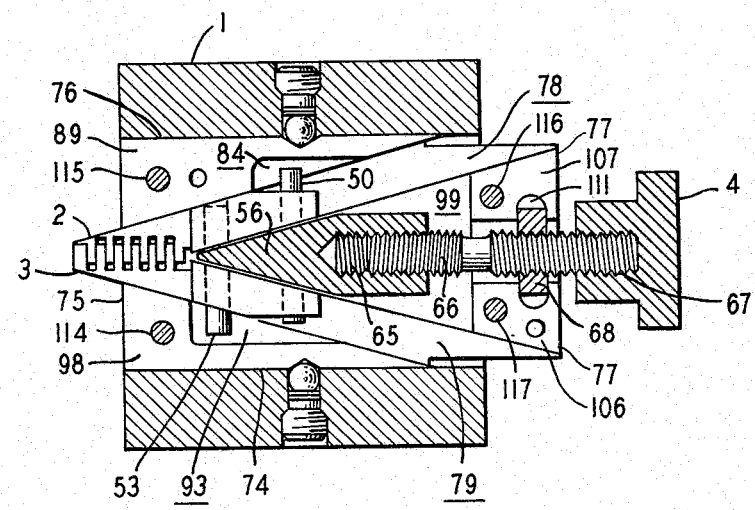
FIG. 7 is a section view on line 7—7 of FIG. 2 and shows the inner housing elements including the base device functionally securing the jaws and adjusting mechanism within the chuck housing in a closed position of the jaws.
Figure 8:
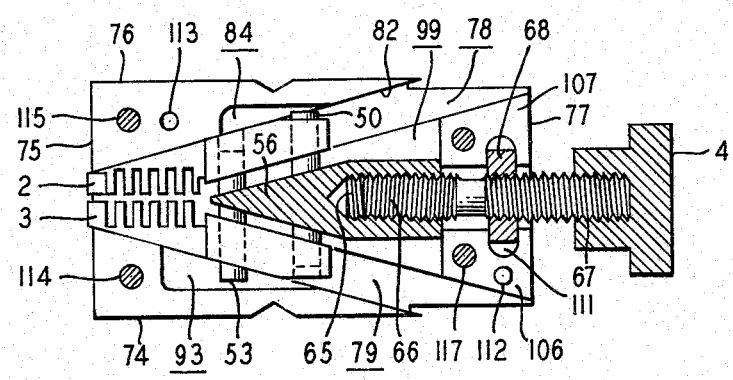
FIG. 8 shows the structure of FIG. 7 for a fully opened position of the jaws.

Another fundamental subassembly of the exemplary chuck unit is the pair of base plates 10 and 11 of FIG. 2 which support the jaws and the adjusting mechanism within the chuck housing 1. Bases 10 and 11 are, by way of example, essentially symmetrical mirror configurations of one another. Accordingly, detailed structural features of only one such base 11 are illustrated in FIGS. 6, 7, and 8. As shown in FIG. 2, base 11 is depicted with a generally semicircular exterior surface 69 and a planar facing wall 70 which has an aperture 29 defined by walls 71, 72 and 73. Base 11 is provided with upper and lower slotted cavities 32 and 30 on the exterior surface 69 for locking the base within the chuck housing 1.

As shown in FIGS. 6, 7, and 8, base 11 is essentially of rectangular shape in inner cross-section as defined by peripheral walls 74, 75, 76, and 77. It includes a pair of jaw channels 78 and 79 forming a "V" shaped passageway for guidedly receiving and cooperating with a shoulder extension of jaw platform 38 and thereby controllably to guide the opening and closing movement of jaws 2 and 3. Channel 78 is in part defined by a wall 80 which rises from a floor surface 81 (wall 73 of FIG. 2) of channel 80 and which has a flat surface taperly extending from a front aperture segment 82 upwardly to a segment 83. A slotted depression 84 is provided in wall 80 between segments 85 and 86 to form a cavity for movement of one of the dowel pins, such as pin 50, during opening and closing of jaws 2 and 3. The shape of slotted wall depression is illustratively an integration curve shape from segment 85 to 87 and then extends in a straight line to a segment 86. A portion of the wall is raised from the floor surface 81 between segments 85 and 86 and to define a shelf surface 88 and thereby a continuous wall guide means for the cooperating shoulder extension of jaw platform 38. Surface 88 is flat and lies in a plane parallel and depressed below that of a flat facing surface 89 (wall 70 of FIG. 2) of base 11.

Similarly, channel 79 is in part defined by a wall 90 which rises from a floor surface 81 (wall 73 of FIG. 2) of channel 79 and which has a flat surface taperly extending from a front aperture segment 91 downwardly to a segment 92. A slotted depression 93 is provided in wall 90 between segments 94 and 95 to form a cavity for movement of one of the dowel pins, during opening and closing of jaws 2 and 3. The shape of the slotted wall depression is illustratively an inverted integration curve shape from segment 94 to 96 and then extends in a straight line to segment 95. A portion of the wall 90 is raised from the floor surface 81 between segments 94 and 95 and to define a shelf surface 97 and thereby a continuous wall guide means for the cooperating shoulder extension of jaw platform 38. Surface 97 is flat and lies in a plane parallel and depressed below that of the flat facing surface 98 (part of wall 70 of FIG. 2) of base 11.

Channels 78 and 79 are further defined by a wedge-shaped platform 99 which comprises walls 100 and 101 which rise from the floor surface 81 to a flat shelf surface of platform 99. Wall 100 is illustratively flat and generally parallel to wall 80. Wall 101 is also illustratively flat and parallel to wall 90. Surfaces 88, 97 and 99 illustratively lie in the same plane. Accordingly, the height of walls 100 and 101 are equal between segments 102 and 103 and between 102 and 104.

Base 11 includes a raised platform 105, as shown in FIGS. 6 and 9, which provides facilities for housing the adjusting mechanism that controls the opening and closing of the chuck jaws. The rasied platform 105 is formed by raised extensions 106 and 107 of walls 100 and 101. Platform 105 includes facing surfaces 108 and 109 (wall 70) of base 11. A concave semicylindrical-shaped wall 110 defines half of a bore in the platform 105 for rotatably housing the threaded shaft 5. An oval cavity 111 is also provided in platform 105 for securing a hex jam nut 68 of the chuck jaw adjusting mechanism.

The jaws and adjusting mechanism subassembly of FIG. 5 are housed within the base 11 as shown in FIGS. 7 and 8 advantageously with an inner shoulder extension of the jaw platform 39 slideably and guidedly inserted in channel 78 and an inner shoulder extension of jaw platform 338 slideably and guidedly inserted in channel 79. In addition, the hex jam nut is nonmovably and frictionally secured within the oval cavity 111. As a consequence, the wedge-shaped body 56 is slideably movable on the wedge-shaped platform 99. Furthermore, as shown in FIG. 7, an extension of dowel pin 53 rests in the slotted depression 93.

In order to achieve a desired range of opening and closure of jaws 2 and 3, it is advantageous to adjust the extent to which the left-hand threads 66 of shaft 5 are threadedly inserted into the bore 65 of body 56, as well as the extent to which nut 68 is threadedly moved on the right-hand threads 67 of shaft 5. It has been found advantageous to make the latter adjustments prior to the locating of the jaw adjusting mechanism within the base plate 11 as shown in FIG. 7.

To achieve a full closure and meshing of the jaw teeth together as illustrated in FIG. 7, knob 4 is manually rotated clockwise. As a consequence, shaft 5 threadedly moves from a right to a left side with the right-hand threaded portion moving through the jam hex nut 68 and with the left-hand threaded portion moving outward from bore 65. The latter actions urge the wedge-shaped body 56 and the dowel pins 50 and 53 forward (left) and, resultingly, move jaws 2 and 3 forward (left) so that their teeth mesh closer together. As the jaws are so moved, the dowel pins 50 and 53 slideably move through bores 63 and 64 (FIG. 4) of the wedge-shaped body 56 and through bores 52 and 55 of the jaw platforms 38 and 39 for providing aligned movement of jaws 2 and 3 with respect to each other. Aligned movement and registration of the teeth is guided by the movement of the jaw shoulders with the channels 78 and 79 of base plate 11. Upon full closure of the jaw teeth, the opening provided by the jaws for a drill bit is precisionly minimal as is illustrated in FIG. 2.

For moving jaws from the closed to an open position as shown in FIG. 8, knob 4 is rotated counterclockwise. As a result, shaft 5 threadedly moves to the right with the right-hand threaded portion moving to the right through the nut 68 and the left-hand threaded portion moving into the threaded bore 65. The latter action urges the wedge body 56 and the dowel pins 50 and 53 rearwardly (right) so that the jaw teeth move away from the meshing position to a position further apart as shown in FIG. 8. Aligned movement and registration of the jaws is guided by the shoulders of jaw platforms 38 and 39 as well as by the dowel pins 50 and 53 within the bores 63 and 64 of body 56.

Accordingly, the adjustable meshing of the jaw teeth define an opening for receiving and embracing a shank of a drill bit. Advantageously, the adjustable opening is constantly a square in shape as shown in FIG. 10 for all adjustments of the adjusting mechanism. The square shape is achieved in part by the "V" shaped geometry of the jaw teeth and by the controlled guided movement of the jaw subassembly within the base plates 10 and 11. The longitudinal length of the adjustable square opening extends the length of the rows of jaw teeth.

To secure the assembly of base plates 10 and 11 together as illustrated in FIG. 2, base 11 is furnished with a guide pin 112, a guide pin hole 12 and four threaded bores 114, 115, 116, and 117. Pin 112 extends upwardly from an upper surfce of the raised extension 106 and matingly interfits with a guiding hole (not shown) of base 10 which is in aligned registration with pin 112 for assembly. The guide pin hole 113 is provided for matingly interfitting for assembly with a guide pin (not shown) of base 10 which is similar to pin 112. These guide pin and hole arrangements facilitate the guided joining of the two plates 10 and 11. Bases 10 and 11 are fastened together by four screws (two of which are shown in FIG. 2 as screws 12 and 13) that extend through four non-threaded bores (not shown) of base 10 and that threadedly interfit with the bores 114, 115, 116 and 117 of base 11. Of course, the four latter bores of base 10 are in aligned registration with bores 114–117 during assembly and fastening and under control of the aforementioned guide pin arrangements.

Knob 4 which is secured to shaft 5 is advantageously a torque knob which is commercially available. It provides a prescribed adjustment such as the full closure and meshing of the jaw teeth and then a disabling of the knob from further turning of shaft 5 when the opposing force of the meshing jaws exceeds a prescribed magnitude.

It is to be understood that the hereinbefore described arrangements are illustrative of the application of principles of our invention. Our illustrative chuck is advantageously useable as a fixture for holding a drill bit during sharpening operations. It is also suitable for attachment to a conventional rotary drill or milling machine. In such applications, the attachment is conveniently made about the base plates 10 and 11 or the housing 1. It is also practical to provide an internal adjustment knob about the shaft 5 threaded portion 67 and to remove the knob 4 in drilling and milling machine applications. Such an internal knob advantageously could replace nut 68 and be manually adjustable by having it extend to the exterior of base plates 10 and 11. In light of our teaching it is apparent that numerous other arrangements may be devised by those skilled in the art without departing from the spirit and scope of our invention.

What is claimed is:

1. A chuck suitable for use in holding an instrument along a check axis and comprising a pair of jaws, each of said jaws having first and second rows of spaced apart teeth, said teeth of said first row aligned at a prescribed angle to teeth of said second row, each of said teeth being in longitudinal alignment with other of said teeth in a same row, said teeth of each said row of one of said pair of jaws longitudinally occurring alternately with respect to one another and with respect to meshable teeth of a second one of said pair of jaws, means guidedly mounting said jaws for an axially convergent movement to effect on adjustable meshing of teeth of each of said jaws to define an adjustable corridor of a prescribed angle for holding said instrument, said mounting means including axially converging channel means, said jaws including portions guidedly mounted within said channel means, each of said jaws having means defining at least one guide bore, adjustment means moving said jaws, said adjustment means including a body having means defining at least one bore therein, and pin means slidably secured in said at least one bore of each of said jaws and said body for guiding said meshing of said teeth of said jaws.

2. The invention of claim 1 wherein said first and second rows of aligned teeth define a right-angled shaped surface portion of said adjustable corridor, said mounting means guidedly controls movement of said jaws for said meshing of said teeth to define an adjustable and constant square shape of said corridor.

3. The invention of claim 1 wherein each of said jaw portions includes a unitary guiding platform protruding from said teeth thereof and having shoulder extensions, each of said guiding platforms having said means defining said at least one bore, said body having said at least one bore in aligned registration with said at least one bore of each of said guiding platforms and said pin means slidably secured within said at least one bore of said platforms and said body for guiding meshing of said teeth of said jaws, said mounting means comprises a pair of base plates, each of said plates having said channel means for guiding an aligned movement of each of said jaws for said adjustable meshing of said teeth, and said adjustment means being supported within said plates.

4. The invention of claim 3 wherein said channel means comprises wall means defining a pair of guide channels.

5. The invention of claim 4 wherein said body includes means defining a threaded aperture, a shaft having an exterior threaded portion for threadedly and matingly interfitting with said threaded aperture, means coupling said body to each of said jaws and means for rotating said shaft threadedly to move said threaded portion thereof within said aperture and to urge said body and coupling means for controllably moving each of said shoulder extensions within respective ones of said channels to adjust said meshing of said teeth and the dimensions of said corridor for holding said instrument.

6. The invention of claim 1 wherein said channel means includes wall means projecting to define a pair of guide channels of a "V" shape, and each of said jaws includes a guide platform extension angularly protruding from said rows of teeth and having means forming said pair of shoulder extensions.

7. The invention of claim 6 wherein each of said first and second rows of aligned teeth define a right-angled "V" shaped surface portion of said adjustable corridor and said aligned teeth of each of said jaws are in meshing registration for defining an adjustable and constant square shape of said corridor during all said rotating of said shaft.

8. A chuck comprising an outer housing having a cylindrical inner bore, a pair of base plates secured within said bore, each of said plates having wall means defining a pair of channels arranged in a "V" shape and extending from a first end to second ends of said each plate and of said bore, a pair of jaws, each of said jaws having first and second rows of spaced apart teeth, said teeth of said first row aligned at a right angle to teeth of said second row, each of said teeth having substantially a cross-sectional triangular shape and in longitudinal alignment with other of said teeth in a same row, said teeth of each said row of one of said pair of jaws longitudinally occurring alternately with respect to one another and with respect to meshable teeth in the rows of another of said pair of jaws, each of said jaws further having a unitary guiding platform arcuately protruding from said teeth thereof and having shoulder extensions each of which guidedly moves in an individual one of said channels, each said guiding platform having means defining a pair of spaced apart bores, adjustment means comprising a wedge-shaped body having means defining another pair of spaced apart bores in aligned registration with said bores of each said guiding platform and a pair of dowel pins each of which slideably moves in said bore of one of said platforms and one of said bores of said body and is secured within said bore of another one of said platforms for guiding a meshing closure and opening of said teeth of said jaws, said wall means of each of said plates including means defining a cavity in each of said channels for guidedly receiving one of said dowel pins during a longitudinal and latitudinal movement thereof, each of said plates further having a raised wedge-shaped platform located between said channels thereof for slideably supporting said wedge-shaped body and a platform extension protruding from said wedge-shaped platform and comprising means defining a semicylindrical bore and means defining a cavity, said body having a threaded bore oriented toward said semicylindrical bore, said adjustment means further comprising a shaft having a left-hand threaded segment matingly interfitted with said threaded bore and a right-hand threaded segment rotatably housed within said semicylindrical bore of each of said plates and extending to an exterior of said plates and said housing, a jam nut frictionally secured within said cavity of each said plate and matingly interfitting with said right-hand threaded segment of said shaft and an adjusting knob secured to said shaft exterior to said housing and said plates for rotating said right-hand threaded segment of said shaft interfittingly and longitudinally through said nut and said left-hand threaded segment of said shaft interfittingly and longitudinally through said threaded bore of said body for urging said body longitudinally against said dowel pins and said dowel pins against said guiding platforms guidedly to move said shoulder extensions of each of said jaws in respective ones of said channels for meshingly closing and opening said teeth of each of said jaws and providing an adjustable and constant square shaped corridor for receivably centering and holding an instrument.

9. A chuck suitable for use in holding an instrument and comprising
a pair of jaws,
a first one of said jaws having plural rows of spaced apart teeth,
a second one of said jaws having a predetermined number of teeth,
each of said jaws having teeth of a first one of its rows aligned at a prescribed angle to said teeth of a second one of its rows, and
means guidedly mounting said jaws for an adjustable meshing of teeth of each of said jaws to define an adjustable corridor of a prescribed shape for holding said instrument,
said mounting means guidedly controlling movement of said jaws longitudinally and latitudinally for said meshing and comprises a pair of base plates,
each of said plates having channel means for guiding an aligned movement of each of said jaws for said adjustable meshing of said teeth, and
adjustment means supported within said plates and coupled to each of said jaws for controllably moving said jaws to adjust said meshing and the dimensions of said corridor for holding said instrument,
said channel means comprises wall means defining a pair of guide channels and
each of said jaws comprises a pair of shoulder extensions, each of which is movably secured in a predetermined one of said channels,
said adjustment means comprises a body having means defining a threaded aperture,
a shaft having an exterior threaded portion for threadedly and matingly interfitting with said threaded aperture,
means coupling said body to each of said jaws and
means for rotating said shaft threadedly to move said threaded portion thereof within said aperture and to urge said body and said coupling means for controllably moving each of said shoulder extensions within respective ones of said channels to adjust said meshing of said teeth and the dimensions of said corridor for holding said instrument,
said threaded portion of said shaft comprises a left-hand threaded segment,
said shaft further includes another threaded exterior portion having a right-hand threaded segment and
said adjustment means further comprises a threaded means secured within said base plate and threadedly interfitting with said right-hand threaded segment of said shaft.

10. The invention of claim 9 wherein
each of said base plates further comprises a platform extension having means defining a semicylindrical bore for rotatably housing said shaft and means defining a cavity, and
said threaded means comprises a threaded jam nut frictionally secured in each said cavity of each said plate and threadedly interfitting with said right-hand threaded segment of said shaft.

11. The invention of claim 10 wherein
said body comprises means defining at least one guide hole,
each of said jaws comprises at least one guide hole, and
said coupling means comprises at least one dowel pin slideably extending through said guide hole of said body and said guide hole of each said jaw for guidedly urging a movement of said jaw shoulder extensions within said channels adjustably to mesh said teeth of each of said jaws in response to said rotating of said shaft.

12. The invention of claim 11 wherein
said body comprises a wedge-shaped device having a pair of front side surfaces between which extends said at least one guide hole of said body and a rearward surface through which said threaded aperture extends, and
each of said base plates further comprises a raised shelf surface slideably supporting said body.

* * * * *